Figure 1:
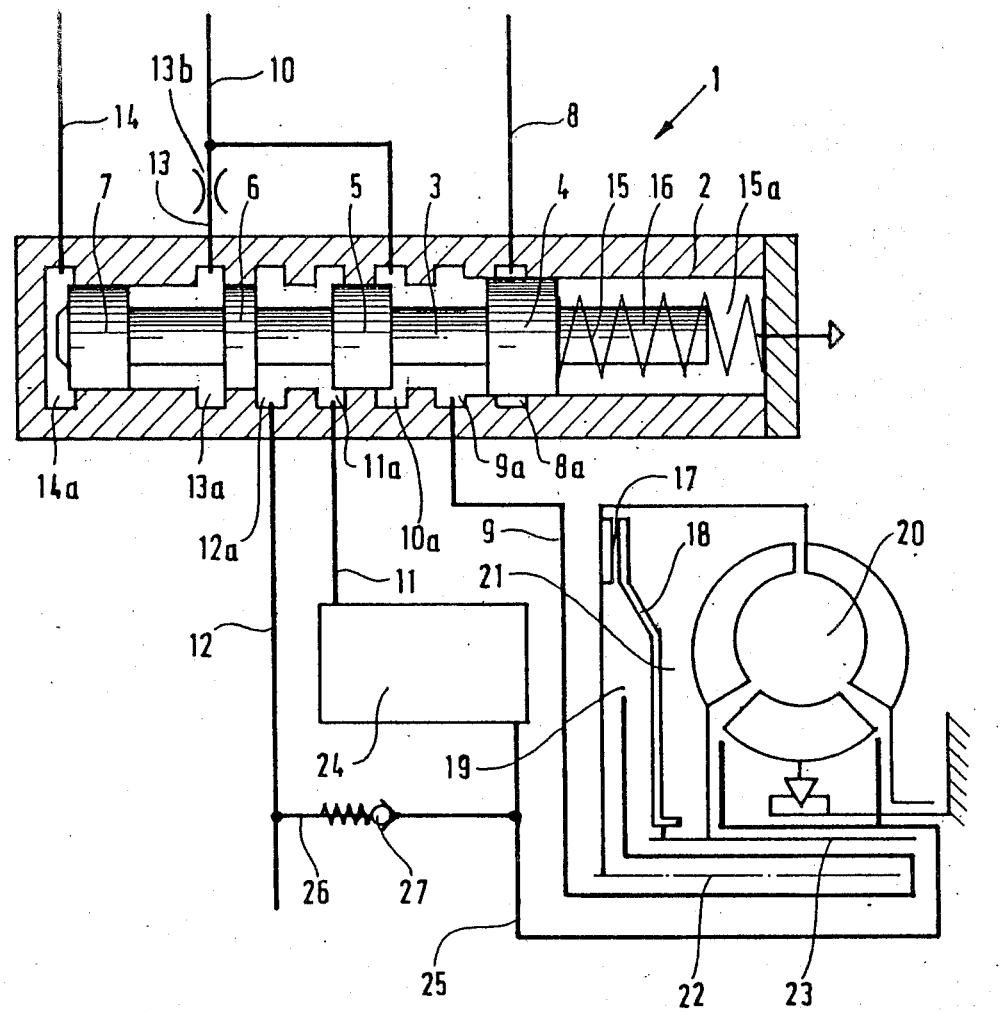

United States Patent [19]

Gierer

[11] Patent Number: 4,458,720
[45] Date of Patent: Jul. 10, 1984

[54] CONTROL VALVE FOR A TORQUE CONVERTER HAVING A BRIDGE COUPLING

[75] Inventor: Georg Gierer, Kressbronn, Fed. Rep. of Germany

[73] Assignee: Zahnradfabrik Friedrichshafen AG, Fed. Rep. of Germany

[21] Appl. No.: 342,652

[22] Filed: Jan. 25, 1982

[30] Foreign Application Priority Data

Feb. 5, 1981 [DE] Fed. Rep. of Germany ....... 3103838

[51] Int. Cl.³ ............................................. F16K 21/00
[52] U.S. Cl. ............................... 137/625.48; 192/3.31
[58] Field of Search ................... 192/3.31, 3.3, 0.076, 192/109 F, 3.57, 3.29, 3.28, 3.58; 74/868; 137/625.48

[56] References Cited

U.S. PATENT DOCUMENTS

| 3,719,093 | 3/1973 | Edmunds | 74/364 |
| 3,719,102 | 3/1973 | Leber et al. | 192/3.57 |
| 3,937,107 | 2/1976 | Lentz | 74/868 |
| 3,977,502 | 8/1976 | Chana | 192/3.31 |
| 4,051,932 | 10/1977 | Arai et al. | 192/3.3 |

FOREIGN PATENT DOCUMENTS 2944811 5/1980 Fed. Rep. of Germany.
2853115 6/1980 Fed. Rep. of Germany.

Primary Examiner—Robert E. Garrett
Assistant Examiner—Randoph A. Smith
Attorney, Agent, or Firm—Hayes, Davis & Soloway

[57] ABSTRACT

A control valve for a torque converter, that has a bridge coupling, in a hydrodynamic-mechanical transmission for motor vehicles. The valve serves to control, by means of a fluid pressure, the bridge coupling of the torque converter to which a mechanical transmission is connected in series. The operational pressure can depend on the position of the power control apparatus of the driving engine and/or on the speed of the engine or the take-off axle of the transmission.

4 Claims, 2 Drawing Figures

CONTROL VALVE FOR A TORQUE CONVERTER HAVING A BRIDGE COUPLING

The invention relates to fluid control valve for the torque converter with bridge coupling, to mechanically couple the impeller and turbine of the converter, in a hydrodynamic-mechanical transmission, suitable for motor vehicles.

Already known is a hydraulic valve arrangement for controlling the bridge coupling of a hydrodynamic torque converter connected in series to a mechanical transmission (see Society of Automotive Engineers Technical Paper Series 780,100). The apparatus comprises several valves actuated by the system pressure, governor pressure and switch pressure of the element that produces the direct motion.

West German Published Patent Application 1,600,728 discloses a charging valve for a torque converter. However, this valve can only be used with A torque converter that has a bridge coupling.

An object of the present invention is to achieve control of the bridge coupling of the torque converter by means of a valve.

According to the invention, there is provided a fluid control valve, for a torque converter having bridge coupling in a hydrodynamic-mechanical transmission for motor vehicles, of the type having a valve body defining a valve bore housing a piston member, moveable between first and second operating positions, having a plurality of piston portions and a piston member biasing spring wherein the improvement comprises:
  (a) the piston member having a first said piston portion to control communication between a vent duct and a pressure duct, the pressure duct being adapted for connection to a coupling space of the bridge coupling of the torque converter to supply fluid under pressure to hold said bridge coupling open;
  (b) the piston member having a second said piston portion to control communication between a transmission fluid-supply duct and said pressure duct and between said transmission fluid-supply duct and a connecting passage.
  (c) the piston member having a third said piston portion arranged to control communication between a constricted duct connected to said transmission fluid-supply duct and a connecting duct and between said connecting duct and said connecting passage, both the connecting duct and said connecting passage being adapted for connection to said torque converter;
  (d) the piston member having a fourth said piston portion responsive to admission of an operating fluid under pressure through an operating fluid supply duct; and
  (e) a biasing means opposing pressure of said operating fluid on said fourth piston; wherein,
     when the operating fluid is below a pressure which will overcome the bias of the biasing means, the piston member is in said first operating position in which said first piston portion closes said vent duct, said second piston portion permits communication only between said transmission fluid supply duct and said pressure duct, and said third piston portion prevents communication between said constricted duct and said connecting duct while permitting communication between said connecting duct and said connecting passage; and wherein,
     when the operating fluid is at a pressure which will overcome the bias of the biasing means, the piston member is in said second position in which said first piston portion permits communication between said vent duct and said pressure duct, said second piston portion permits communication only between said transmission fluid-supply duct and said connecting passage, and said third piston portion prevents communication through the valve between said connecting duct and said connecting passage and permits communication between said constricted duct and said connecting duct, said valve in said first position functioning to hold said bridge coupling open and in said second position to hold said bridge coupling closed.

The advance provided by this control valve is the control of the bridge coupling exclusively by this one valve under the influence of an operational pressure which depends on engine operation as represented by accelerator position and/or on engine or vehicle speed together with the valve also being suitable for use, without modification, with a torque converter not having a bridge coupling. The use of the valve in automatic transmissions is especially favorable since the bridging of the converter significantly reduces the consumption of fuel.

Figure 2:
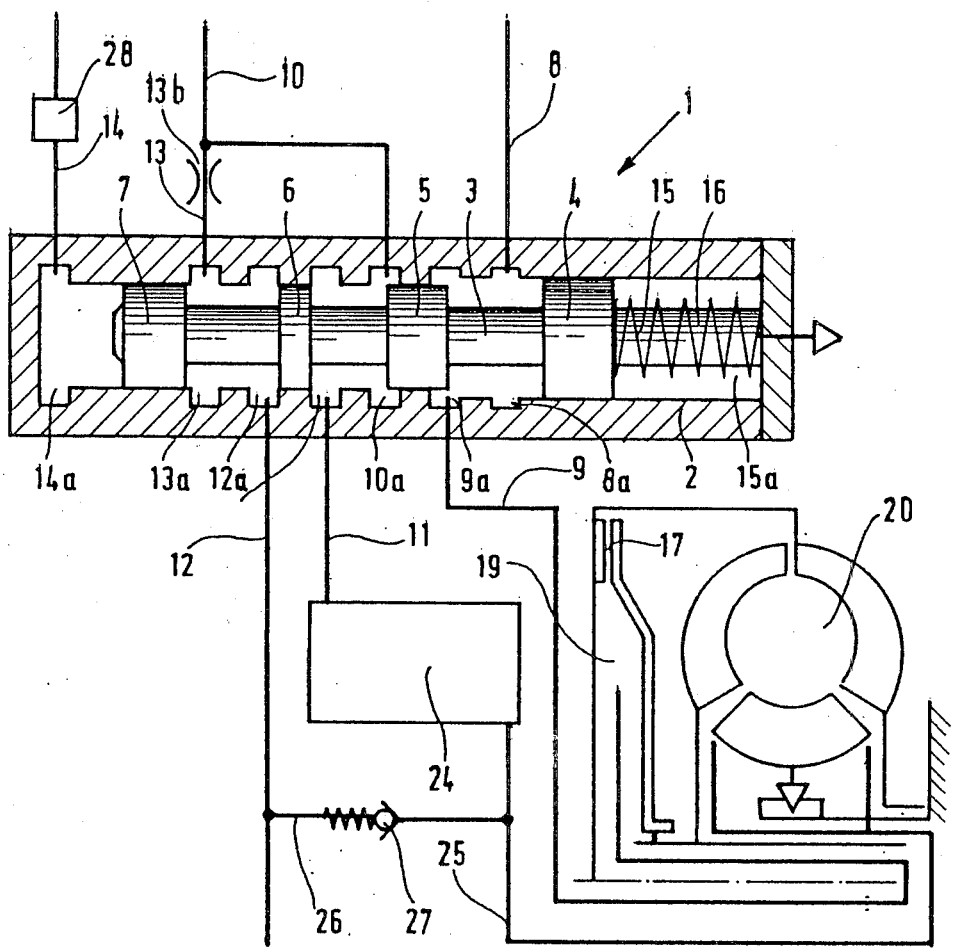

The invention will now be described, by way of example, with reference to the accompanying drawings which diagrammatically illustrate a hydrodynamic torque converter equipped with a bridge coupling and a control valve therefore and in which:

FIG. 1 shows the valve and the torque converter with the bridge coupling open; and FIG. 2 shows the valve and the torque converter with the bridge coupling closed.

With reference to FIGS. 1 and 2 the pressure and reversing valve 1 has a valve body 2 having a valve bore in which is disposed a piston member 3 having valve control pistons (or lands or spools) 4, 5, 6, and 7 to control the passage of fluid through the valve. The valve body includes a plurality of annular recesses (8a, 9a, 10a, 11a, 12a, 13a, and 14a) and associated ports controlled by the piston member 3. Annulus 8a connects with a vent duct 8 that is controlled by control piston 4. A pressure duct 9 discharge in adjacent annulus 9a. A transmission fluid-supply duct 10 is connected to annulus 10a that is controlled by a control piston 5 in a manner such that the transmission fluid-supply duct 10 is or is not (depending on the valve's operating condition) connected with the pressure duct 9. The control piston 5 also controls an annulus 11a which is connected to passage 11 that leads to the heat exchanger (radiator) 24. The next annulus 12a is connected to a connecting duct 12. Said duct 12 and a throttle duct 13 (constricted by constriction 13b), that is connected to the next annulus 13a, are controlled by control piston 6. Annulus 14a is connected to a duct 14 and defines, with piston 7, a closed cylinder, except for the connecting port to duct 14. Duct 14 supplies a valve operating fluid at an operational pressure to move the control piston 7 against the force of a biasing spring 15 that is supported between the control piston 4 and the end of the valve bore remote from annulus 14a. The operational pressure can be a pressure depending on the position of the power control device (accelerator) and/or on the speed of the vehicle or engine. The end of the control piston 4 that faces and abuts the spring 15 has a stop 16 to limit movement of the piston member 3 under the action of the operational pressure acting upon the control piston 7 against the bias of spring 15.

The piston 4 has a larger diameter than the pistons 5, 6 and 7.

The mode of operation of the valve is the following.

Fluid at an operating pressure is fed to the valve 1 through the fluid-supply duct 10. When the piston member 3 is in the operating position shown in FIG. 1 with the biasing spring 15 exerting greater biasing force than the opposing force exerted by fluid in annulus 14a, the fluid from duct 10 is connected, by way of annulus 9a and duct 9 to bridge coupling operating spaces 19 and 21 of a bridge coupling 17 of a torque converter 20 to hold the bridge coupling open by fluid pressure differential on bridge coupling closing piston 18.

Fluid leaving the torque converter 20 is fed to the heat exchanger 24 through the fluid duct 25. From the heat exchanger 24 the fluid is fed via connecting passage 11 to the valve 1, which it again leaves through duct 12.

When fluid at a valve operating pressure is fed to the annulus 14a via the duct 14, the piston member 3 is moved against the bias of the spring 15 until the stop 16 comes in to abutment with the valve body 2 (see FIG. 2). In this valve position duct 9 is conected to the duct 8 while duct 10 is connected, via duct 11, and the radiator 24, to the fluid duct 25 and the torque converter 20. With the influx of fluid to the impeller P, the bridge coupling 17 is immediately closed by the pressure differential acting on the closing piston 18 thereby to mechanically couple the torque-converter's impeller P and turbine T and consequently impeller shaft 22 and turbine shaft 23 together.

As soon as there is insufficient operational pressure in the duct 14, the piston member 3 returns to the position shown in FIG. 1 where the pressure duct 9 is again connected with the duct 10 so that the fluid again arrives at the torque converter through the bridge coupling space 19 to again open the bridge coupling.

To control the operational pressure, of fluid in duct 14, there may, in some embodiments, be arranged in the duct 14 a valve 28 (FIG. 2 only) that is fluid and/or electrically operated.

As long as the fluid at sufficient operational pressure acts upon the control piston 7, fluid is fed to the duct 12 from the fluid-supply duct 10 via a construction 13b.

When the bridge coupling is closed, the passage 26 ensures flow through the radiator to the lubricant duct 12.

In order to protect the bridging coupling against excess pressure, a check valve 27 is disposed in the connecting passage 26.

I claim:

1. A fluid control valve, for a torque converter having a bridge coupling in a hydrodynamic-mechanical transmission for motor vehicles, of the type having a valve body defining a valve bore housing a piston member, moveable between first and second operating positions, having a plurality of piston portions and a piston member biasing spring wherein the improvement comprises;

(a) the piston member having a first said piston portion to control communication between a vent duct and a pressure duct, the pressure duct being adapted for connection to a coupling space of the bridge coupling to supply fluid under pressure to hold said bridge coupling open;

(b) the piston member having a second said piston portion to control communication between a transmission fluid-supply duct and said pressure duct and between said transmission fluid-supply duct and a connecting passage;

(c) the piston member having a third said piston portion arranged to control communication between a constricted duct connected to said transmission fluid-supply duct and a connecting duct when the piston member is between said connecting duct and said connecting passage, both the connecting duct and said connecting passage being adapted for connection to said torque converter;

(d) the piston member having a fourth said piston portion responsive to admission of an operating fluid under pressure through an operating fluid supply duct; and (e) a biasing means opposing pressure of said operating fluid on said fourth piston portion; wherein,
   when the operating fluid is below a pressure which will overcome the bias of the biasing means, the piston member is in said first operating position in which said first piston portion closes said vent duct, said second piston permits communication only between said transmission fluid supply duct and said pressure duct, and said third piston portion prevents communication between said constricted duct and said connecting duct while permitting communication between said connecting duct and said connecting passage; and wherein,
   when the operating fluid is at a pressure which will overcome the bias of the biasing means, the piston member is in said second position in which said first piston portion permits communication between said vent duct and said pressure duct, said second piston permits communication only between said transmission fluid-supply duct and said connecting passage, and said third piston portion prevents communication through the valve between said connecting duct and said connecting passage and permits communication between said constricted duct and said connecting duct, said valve in said first position functioning to hold said bridge coupling open and in said second position to hold said bridge coupling closed.

2. A control valve according to claim 1 in combination with a hydrodynamic-mechanical transmission, wherein the valve is adapted to operate on a pressure of fluid fed through the fluid supply duct to the valve which is determined by engine operation.

3. A control valve according to claim 2 wherein a linking passage with a back pressure valve therein is disposed between said connecting duct and said connecting passage, a heat exchanger being interposed between the linking passage and said valve in said connecting passage, said back pressure valve being oriented to permit flow of fluid only above a desired pressure from said connecting passage to said connecting duct.

4. A control valve according to claim 3, wherein said first piston portion has a larger diameter than the other piston portions.

* * * * *

UNITED STATES PATENT AND TRADEMARK OFFICE
CERTIFICATE OF CORRECTION

PATENT NO. : 4,458,720

DATED : July 10, 1984

INVENTOR(S) : Georg GIERER

It is certified that error appears in the above—identified patent and that said Letters Patent is hereby corrected as shown below:

Claim 1, Column 4, Line 27, insert after the word "piston" the word --portion--.

*Signed and Sealed this*

*Twentieth* Day of *November 1984*

[SEAL]

*Attest:*

GERALD J. MOSSINGHOFF

*Attesting Officer*     *Commissioner of Patents and Trademarks*